US011235846B2

(12) United States Patent
Pashley et al.

(10) Patent No.: US 11,235,846 B2
(45) Date of Patent: Feb. 1, 2022

(54) PREVENTION OF CAVITATION (71) Applicants: NewSouth Innovations Pty Limited, Sydney (AU); John Joseph Antony, Geelong (AU)

(72) Inventors: Richard Mark Pashley, Cook (AU); John Joseph Antony, Geelong (AU); Mojtaba Taseidifar, Franklin (AU)

(73) Assignee: NewSouth Innovations Pty Limited, Sydney (AU)

( * ) Notice: Subject to any disclaimer, the term of this patent is extended or adjusted under 35 U.S.C. 154(b) by 0 days.

(21) Appl. No.: 16/606,891

(22) PCT Filed: Apr. 20, 2018

(86) PCT No.: PCT/AU2018/050361
§ 371 (c)(1),
(2) Date: Oct. 21, 2019

(87) PCT Pub. No.: WO2018/191790
PCT Pub. Date: Oct. 25, 2018

(65) Prior Publication Data
US 2020/0079483 A1 Mar. 12, 2020

(30) Foreign Application Priority Data
Apr. 21, 2017 (AU) .............................. 2017901468

(51) Int. Cl.
*B63H 1/28* (2006.01)
*B63H 1/18* (2006.01)
(Continued)

(52) U.S. Cl.
CPC ................. *B63H 1/28* (2013.01); *B63H 1/18* (2013.01); *B63H 1/26* (2013.01); *B63H 5/16* (2013.01);
(Continued)

(58) Field of Classification Search
CPC ...... B63H 1/18; B63H 1/28; B63H 2001/286; F15B 21/04; F15B 21/047; B01D 19/00
(Continued)

(56) References Cited

U.S. PATENT DOCUMENTS 4,585,465 A 4/1986 Suzuki et al.
5,064,449 A * 11/1991 Ford .................. B01D 19/0078
95/261

(Continued)

FOREIGN PATENT DOCUMENTS

CN 204452899 U 7/2015
WO 2012161721 A1 11/2012
WO 2014165121 A1 10/2014

OTHER PUBLICATIONS

International Search Report and Written Opinion pertaining to PCT/AU2018/050361, dated May 25, 2018.

*Primary Examiner* — Daniel V Venne
(74) *Attorney, Agent, or Firm* — Dinsmore & Shohl LLP (57) ABSTRACT

This disclosure relates to a system for reducing cavitation at a surface that moves relatively with respect to a first fluid. The system comprises a degasser configured to at least partially degas a second fluid. The system also comprises a reservoir in communication with the degasser and configured to house the at least partially degassed second fluid, the reservoir having an outlet that is arranged for directing the second fluid towards the surface. The system is configured such that the directing of the at least partially degassed second fluid towards the surface forms a boundary layer at the surface. The boundary layer is adapted to at least partially increase the negative pressure required to initiate cavitation at the surface so as to reduce the occurrence of cavitation during such relative movement.

21 Claims, 6 Drawing Sheets

(51) Int. Cl.
*B63H 1/26* (2006.01)
*B63H 5/16* (2006.01)
*F04B 11/00* (2006.01)
*F15B 21/047* (2019.01)

(52) U.S. Cl.
CPC ......... *B63H 2001/286* (2013.01); *F04B 11/00* (2013.01); *F04B 2205/06* (2013.01); *F15B 21/047* (2013.01)

(58) Field of Classification Search
USPC .................................... 440/1, 38, 47, 49, 66
See application file for complete search history.

(56) References Cited

U.S. PATENT DOCUMENTS

| | | | | |
|---|---|---|---|---|
| 7,238,085 | B2 * | 7/2007 | Montierth | A61B 8/546 451/36 |
| 10,413,853 | B2 * | 9/2019 | Kawamoto | B01D 19/0042 |
| 10,675,560 | B2 * | 6/2020 | Kawamoto | B01D 19/00 |
| 2010/0258046 | A1 | 10/2010 | Berger et al. | |

\* cited by examiner

PREVENTION OF CAVITATION

TECHNICAL FIELD

The disclosure relates to methods and systems for reducing cavitation on surfaces that move relative to a fluid, such as impellers, propellers, hydrofoils, water jet intakes, pistons, pipes and control valves.

BACKGROUND

Cavitation is the formation of vapour cavities in hydraulic systems due to a consequence of forces acting upon the hydraulic system. Cavitation generally occurs when the local pressure falls sufficiently far below a saturated vapour pressure of a fluid, a value given by the tensile strength of the fluid at a certain temperature. In order for cavitation inception to occur, the vapour cavities generally need a surface on which they can nucleate. This surface can be provided by the sides of a container, pipe or valve, by impurities in the fluid, or by small undissolved microbubbles within the fluid. When subjected to higher pressure, the cavities implode and can generate an intense shock wave.

Cavitation has an effect on the efficiency of fluid transmission and generally leads to materials degradation in hydraulic systems. Fluid pumping installations are designed to prevent cavitation in order to ensure steady fluid flow through piping. Cavitation is also the main cause for the limitation of speed in fast, ocean going vessels due to cavitation effects on hydrofoils and propellers.

Cavitation can also cause wear on materials in a hydraulic system. The most common examples of cavitation wear are to pump impellers, propellers, and bends in fluid circuits where a sudden change in a direction of flow occurs. For example, as a blade of an impeller or propeller moves through a fluid, a low pressure is formed as the fluid accelerates around and moves past the blades. The faster the blade moves, the lower the pressure can become. As the pressure reaches the vapour pressure of the fluid at a given temperature, the fluid vaporizes and forms small bubbles of gas. When these bubbles coalesce, the resultant coalesced bubble can collapse/implode and thereby generate the intense cavitation shock wave which can cause wear on materials.

The main approaches by industry to mitigate against the detrimental effects of cavitation are to select operating conditions, geometric design of systems that reduce the occurrence of cavitation, or the use of hard materials to resist wear caused by cavitation. For example, the maximum shaft speed of centrifugal pumps and propellers is typically limited to ensure that cavitation does not occur at the blades of the impeller or propeller.

It is to be understood that, if prior art is referred to herein, such reference does not constitute an admission that the prior art forms a part of the common general knowledge in the art, in Australia or any other country.

SUMMARY

Disclosed is a method for reducing cavitation at a surface that moves relatively with respect to a first fluid. The method comprises directing a second fluid that is at least partially degassed towards the surface such that the second fluid is able to form a boundary layer at the surface. The boundary layer at least partially increases the negative pressure required to initiate cavitation at the surface so as to reduce the occurrence of cavitation during such relative movement.

It has been surprisingly observed that the direction of a degassed fluid towards a surface can reduce cavitation at that surface. The presence of dissolved non-polar gas molecules in the first fluid may produce nucleation sites throughout the first fluid. Both aqueous and non-aqueous fluids show similar effects, and, in addition, non-polar fluids have an increased capacity to dissolve gases relative to water. Therefore, degassing the second fluid can also help to reduce the number of gas-derived nucleation sites by providing a boundary layer of degassed fluid at the surface. Thus, providing the degassed boundary layer may help to alleviate or even completely prevent cavitation during relative movement of the surface with the first fluid.

When the surface forms part of a propeller that is used to propel an ocean-going vessel, the method may help to significantly improve performance and efficiency of the vessel. The same may also apply to reducing cavitation at the surface of impellers or pistons used in a pump, through restriction orifices and valves, water jet intakes and hydrofoils. The valves and orifices may be associated with an industrial plant, such as a refinery or power plant, or injection system, such as those used in vehicle fuel and lubrication systems and printers. The method may help to at least reduce degradation and wear of the surface during such relative movement.

Collapse of the cavities formed during cavitation sends a shockwave through the fluid. Depending on the amount of cavitation, this can cause significant amounts of noise. Reducing or eliminating cavitation may also help to reduce noise associated with the surface in use. This can be helpful for comfort reasons but may also serve a strategic advantage. For example, submarines are designed to produce as little sound as possible so as to prevent detection. Therefore, the disclosed method may help to reduce cavitation noise associated with for example propellers of submarines or other naval vessels.

When the terminology "surface that moves relatively with respect to a first fluid" is employed, it should be understood to include movement of a surface past a first fluid, or movement of a first fluid past a surface, or both. In the former, the first fluid may be stationary or may be flowing. In the latter, the surface may be fixed in position, such as a sidewall of a pipe, valve, etc. As a further alternative, both the surface and the fluid may be moving (e.g. at different rates, in different directions, etc. to each other i.e. a fuel injector).

The method may also be used to minimize, delay or prevent flow separation and/or ventilation. Flow separation and ventilation are each thought to be brought on, or at the very least facilitated, by cavitation. Flow separation is when the angle of attack of a foil section, such as a hydrofoil, is high enough that the fluid flow leaves the surface of the blade shortly after the leading edge, and therefore leaves behind a void which would comprise an air gap surrounded by water. Ventilation is when a tunnel of air forms between a surface and a fluid flowing over the surface, such as an hydrofoil or a water jet intake. For a surface moving under water, such as a hydrofoil, both flow separation and ventilation may occur in addition to cavitation. Providing a boundary layer may help to reduce and/or eliminate flow separation and/or ventilation. This may help to improve the in use efficiency of surfaces that would otherwise be associated with these phenomena.

In one embodiment, the second fluid may be degassed by more than 50%, such as by more than 60%, 70% 80% or 90%, relative to a gassed-equilibrated form of the second fluid. In some embodiments, the level of degassing of the second fluid is relative to the first fluid. In some embodiments, the second fluid may be degassed by more than 95%. Generally, the higher the degassed percentage, the larger the negative pressure required to produce cavitation (e.g. formation, initiation and facilitation of cavities etc.). For example, a theoretical negative pressure of approximately 5 atm can be required to form cavitation for a 80% degassed fluid, a theoretical negative pressure of approximately 10 atm can be required to form cavitation for a 90% degassed fluid, and a theoretical negative pressure of approximately 100 atm can be required to form cavitation for a 99% degassed fluid. The amount of degassing required will depend upon the negative pressure sought to be created. However, it has been observed that generally only a modest amount of degassing may be required.

When the terminology "gas-equilibrated form" or "gassed-equilibrated form" is employed in reference to a second fluid which the surface is moving through, it should be understood that the terms refer to a form of said second fluid which comprises dissolved gasses at a saturated dissolved concentration, in gas equilibrium with the surrounding atmosphere at any given fluid temperature.

The amount of degassing required may be determined by the application in which the surface is employed. For example, impellers used in a pump often operate at high RPM and can produce significant low pressures at the low pressure side of the pump. Since fluid flow relative to surfaces such as propellers, impellers, pistons and valves is often performed within operational parameters to prevent cavitation, the disclosed method may help to improve these operational conditions. For example, an impeller in a pump or a propeller on a vessel may be able to be operated at a higher RPM, the blades may be oriented at a higher angle of attack at a fixed RPM, or the propeller shaft may be at a greater angle relative to the vessel velocity, before cavitation occurs.

The second fluid may be directed towards the surface at a first volumetric flow rate. The first fluid may move relatively at a second volumetric flow rate. In some embodiments, the first volumetric flow rate may be up to 50% of the second volumetric flow rate. In some embodiments, the first volumetric flow rate may be approximately 5-20% of the second volumetric flow rate, such as about 10-15%. In some embodiments the first volumetric flow rate may be less than 10% of the second volumetric flow rate. It has been observed that a lower volumetric flow rate of the second degassed fluid can be employed because the boundary layer may only need to form a thin layer in some embodiment. In some embodiments the second fluid may be periodically directed to the surface using a pulsed flow to form the boundary layer. The second fluid may be pulsed under a slightly enhanced positive pressure. The second fluid may be directed to a low pressure region associated with the surface The required volumetric flow rate of second fluid can be determined by the volume of the boundary layer. The volumetric flow rate of the second fluid will generally need to be such that the boundary layer can be maintained. Since the boundary layer is not static, it will need to be replenished with the at least partially degassed second fluid. Therefore, the volumetric flow rate of the second fluid can be determined by the rate at which the boundary layer will need to be replenished. The surface has an associated surface area e.g. the surface area of a propeller blade. The thickness of the boundary layer, and in turn the volume of water required to form the boundary layer, can be given by the Reynolds number using the following equation:

$$\frac{\delta}{x} = \frac{5}{\sqrt{Re}}$$

where $\delta$ is the thickness of the boundary layer, x is the distance from an edge of the surface to which $\delta$ is calculated, and Re is the Reynolds number. The Reynolds number is a measure of the speed of flow over a flat plate, such as a propeller blade. The thickness $\delta$ and the rate at which the boundary layer needs to be replenished can be used to calculate the volumetric flow rate of the second fluid. However, the best method used to determine the boundary layer thickness and other associated fluid dynamics parameters such as the volumetric flow rate of the second fluid will be dependent on the surface type and application e.g. hydrofoil surface vs. a propeller surface.

Figure 9:
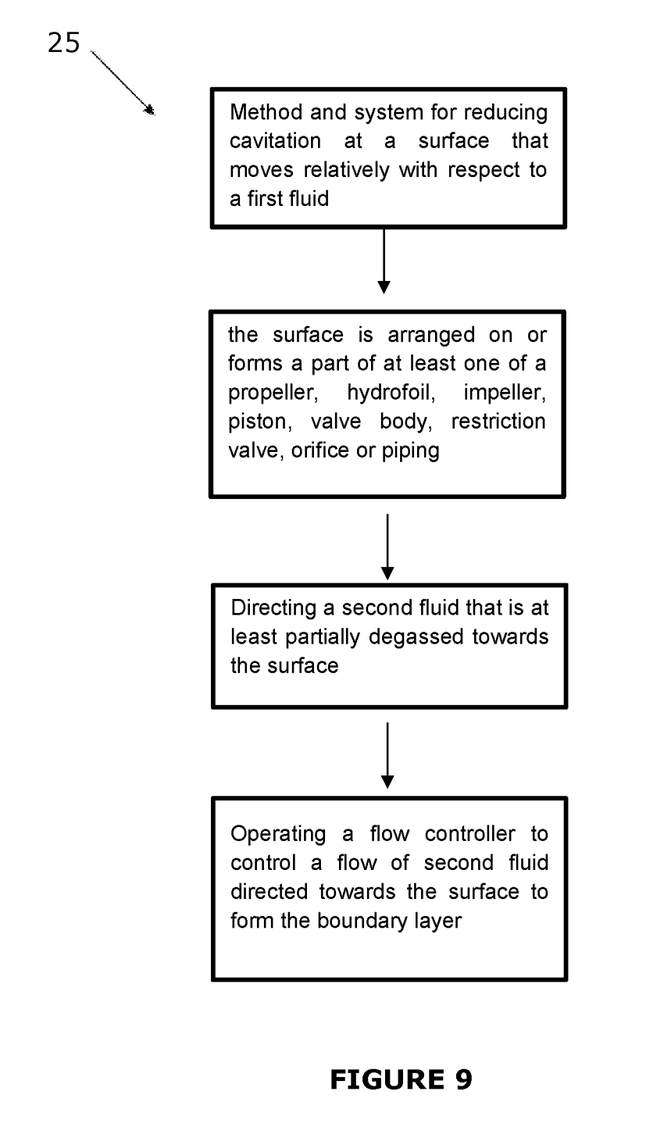
FIG. 9 shows schematically an embodiment of the method and system for reducing cavitation at a surface.

In one embodiment, as is illustrated schematically in FIG. 9, the second fluid 15 may be delivered through a conduit 18 having an outlet that opens into the first fluid 5. The conduit 18 may have a plurality of outlets 20. A plurality of conduits may be used to deliver the second fluid 15 to form the boundary layer. The conduit 18 may be positioned at a low pressure side associated with the surface. The surface may form a part of or be at least one of a propeller, hydrofoil, impeller, valve body, restriction valve, orifice, piping, channels, etc., which are collectively illustrated schematically by block element 25. Or, as discussed below, as part of a piston, which is also represented schematically as block element 25. In this way, the method may be generally used to minimise or prevent cavitation in a wide variety of applications for a wide variety of geometries.

For surfaces such as propellers and impellers that can be rotated in both clockwise and counter-clockwise directions, the low pressure side of the propeller or impeller is determined by its direction of rotation. There may be a conduit placed on either side of the propeller or impeller in an axial direction along the shaft associated with the propeller or impeller. A valve may be in communication with the conduit to direct the second fluid to the low pressure side. Alternatively, the outlet may be integral with the propeller, hydrofoil or impeller. For example, the propeller may have an internal conduit on each blade, and a series of outlets may be positioned at or near the leading edge of the low pressure side of each blade or hydrofoil.

In one embodiment, the second fluid may be a degassed form of the first fluid. In this way, the first fluid may readily be displaced by the second fluid when the latter is directed towards the surface. The first fluid and/or the second fluid may be an aqueous solution(s). The first fluid and/or the second fluid may be a non-aqueous solution(s). The non-aqueous solutions may include liquefied gasses such as cryogenic fluids, liquid oxygen, hydrogen, ammonia etc. The aqueous solution may be seawater. The aqueous solution may be fresh water. The non-aqueous fluid may be hydrocarbon-based. The second fluid may contain a proportion of the first fluid (e.g. the second fluid may be mixed with a portion of the first fluid).

In one embodiment, the method may further comprise operating a flow controller to control the flow of second fluid directed towards the surface to form the boundary layer. The flow controller may be a valve and/or a pump, and/or may be programmable by computer logic associated with a computer. Sensors may be used to determine the first and/or second volumetric flow rate. The sensors may be in communication with the flow controller. A pressure sensor may be used to determine the pressure(s) associated with, and to locate, a low pressure side and a high pressure side of the surface. The flow controller may be in communication with the pressure sensors.

Also disclosed is a vessel operated using a method as set forth above. The vessel may be an ocean-going (or freshwater) vessel such as a boat, yacht, cargo ship, navy vessel, or submarine. The vessel may have hydrofoils. The method may be used to minimise cavitation on hydrofoils, propellers, impellers and water jet intakes associated with the vessel.

Also disclosed is a system for reducing cavitation at a surface that moves relatively with respect to a first fluid. The system comprises a degasser configured to at least partially degas a second fluid. A reservoir is in communication with the degasser. The reservoir is configured to house the at least partially degassed second fluid. The reservoir also has an outlet for directing the second fluid towards the surface. The system is configured so that directing of the at least partially degassed second fluid towards the surface forms a boundary layer at the surface. The boundary layer is adapted to at least partially increase the negative pressure required to initiate cavitation at the surface so as to reduce the occurrence of cavitation during such relative movement.

The degasser may be configured to degas the second fluid by more than 50%, such as by more than 80%. The degasser may be configured to degas the second fluid by more than 50% at a rate of approximately 10,000 L/hour. In some embodiments, the degasser produces more than 10,000 L/hour of degassed fluid. In some embodiment, the degasser produces less than 10,000 L/hour of degassed fluid. For example, the degasser may produce 1,000 L/hour of 99.5% degassed fluid. As the required level of degassing decreases, the amount of degassed fluid that the degasser can produce can increase since the output rate of the degasser is generally inversely proportional to the required degassing rate. The degasser may comprise a vacuum system. Gas removed from the second fluid may be recycled or used as feed stocks e.g. in fuel cells. For example, such recycling or re-use may be carried out in a closed system such as a submarine.

The degasser may comprise (hydrophobic) hollow-fibre membranes. The degasser may be a continuous flow degasser. This may help to ensure that a constant supply of degassed second fluid is directed towards the surface. The reservoir may be integral with the degasser. For example, the reservoir may be a pipe connected to an outlet of the degasser. For embodiments where the reservoir is a tank, a vacuum system may be provided to ensure that the degassed fluid stored in the reservoir remains under vacuum and remains degassed at a predetermined value e.g. 80% or greater. In some embodiment, a freezing system may be used in conjunction with the reservoir to create a frozen layer on top of the at least partially degassed fluid so as to maintain a desired degassing level. In some embodiments, the degasser may include a centrifugal degasser.

The system may be configured to direct the second fluid towards the surface at a first volumetric flow rate. The first fluid may be configured to be directed towards the surface at a second volumetric flow rate. The first volumetric flow rate may be up to 50% of the second volumetric flow rate.

The outlet may be positioned at a low pressure side associated with the surface in use. The surface may be at least one of a propeller, hydrofoil or impeller. The surface may be associated with an orifice or restriction valve. The outlet may be provided on (e.g. as a part of) the propeller, hydrofoil, impeller or orifice. The outlet may be provided towards an end of a conduit. The outlet may comprise a plurality of outlets. The plurality of outlets may be positioned along a longitudinal or circumferential axis of the conduit.

The system may further comprise a flow controller in communication with the reservoir for controlling the rate of delivery of the second fluid in use. The flow controller may be a valve and/or a pump, and/or be programmable by computer logic associated with a computer. Sensors may be used to determine the first and/or second volumetric flow rate.

The sensors may be in communication with the flow controller. A pressure sensor may be used to determine the pressure(s) associated with a low pressure side and a high pressure side of the surface. The flow controller may be in communication with the pressure sensors. The flow controller may be a valve, such as a variable aperture valve, associated with the outlet. The flow controller may allow the degassed fluid to be delivered to the surface continuously and/or periodically using a pulsed flow rate.

Also disclosed is a system for reducing cavitation at surface that moves relatively with respect to a first fluid. The system comprises a degasser for degassing a second fluid, a reservoir for holding the second fluid and that is in communication with the degasser, and an outlet in communication with the reservoir for directing the second fluid towards the surface.

Also disclosed is a vessel comprising the system as set forth above. The vessel may be operated using the method as set forth above.

BRIEF DESCRIPTION OF THE FIGURES

Embodiments will now be described by way of example only with reference to the accompanying non-limiting Figures.

DETAILED DESCRIPTION OF EMBODIMENTS

Figure 1:
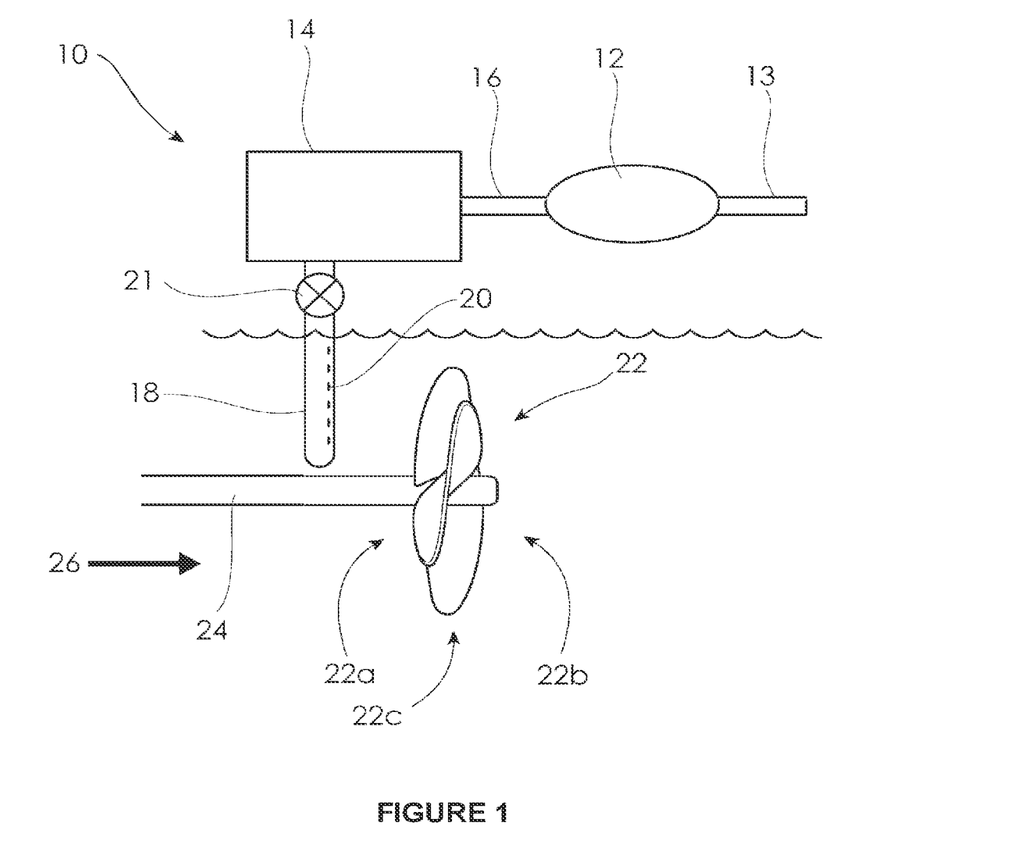
FIG. 1 shows an embodiment of a system for reducing cavitation at a surface of a propeller.

FIG. 1 shows a system 10 for reducing cavitation at surface. In FIG. 1, the surface is in the form of propeller blade 22. The blade 22 is connected to shaft 24. Shaft 24 is connected to an engine or motor to drive the blade 22 (not shown). Rotation of shaft 24 rotates blade 22 which causes the relative movement of the surface with the first fluid. The first fluid is the fluid generally surrounding the shaft 24 and blade 22. In some embodiments, such as when the surface is an inner surface of a pipe, the relative movement is provided by movement of the first fluid past the inner surface of the pipe i.e. the pipe is stationary and the first fluid moves. In the embodiment of FIG. 1, the first fluid is water, but other fluids such as hydrocarbons could be used.

The system 10 also has a degasser 12 for degassing a second fluid. In the embodiment of FIG. 1, the second fluid is water, but other fluids such as hydrocarbons, hydraulic fluids, or refrigerants could be used. The degasser 12 has an inlet in the form of conduit 13. Gassed water, in this case the same fluid as the first fluid, is passed into degasser 12 via conduit 13. Once the water is at least partially degassed, it is then passed into reservoir 14 via conduit 16. Reservoir 14 is configured to house a quantity of degassed water. The terms degassed, at least partially degassed and partially degassed are used through this disclosure interchangeably to describe the second fluid.

Reservoir 14 may optionally be fitted with a system that maintains a predetermined about of degassing (not shown). In some embodiments, reservoir 14 is equipped with a vacuum source that can reduce the pressure inside reservoir 14 to allow degassed water to be stored when system 10 is not in use. The predetermined amount of degassing will determine the pressure inside reservoir 14. Therefore, storage of the degassed fluid only requires the vacuum to pump to operate at a level sufficient to prevent undissolved gasses from dissolving back into the degassed fluid, which is limited by the rate of gaseous diffusion. For example, if a degassing level of 50% is required, the negative pressure inside the reservoir 14 will be set to maintain that level of degassing. When the reservoir is fitted with a vacuum source, the pressure inside reservoir 14 will be below the partial pressure of the degassed fluid and to assist in maintaining a predetermined degassing gas level.

Figure 6:
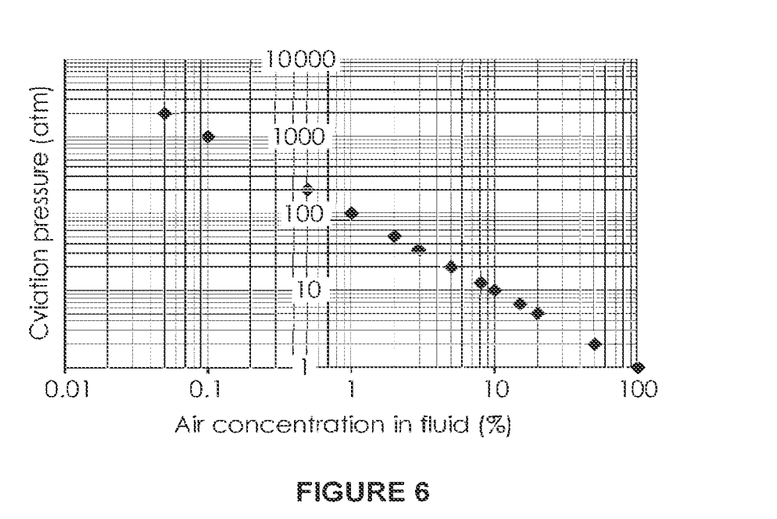
FIG. 6 shows a graph displaying theoretical water cavitation levels at given pressures.

The degassing level of the water is determined by the application and use of the surface. In the embodiment of FIG. 1, the rate of degassing is determined by the speed at which the blade 22 is rotated. When blade 22 is rotated at high speeds, a negative pressure, i.e. low pressure, is formed on the low pressure side 22a as determined by Bernoulli's principle. The faster the blade 22 is rotated, the lower the pressure on the low pressure side 22a. Since cavitation occurs when the pressure on the low pressure side of blade 22 is less than the partial pressure of the first fluid, determining the pressure on the low pressure side can be used to calculate the amount of degassing required. For example, FIG. 6 shows theoretical negatives pressures (cavitation pressure) required to initiate cavitation at a given degassing valve (air concentration).

If the pressure on the low pressure side is determined to be 10 atm, then the water will need to contain at most 10% air i.e. be degassed by at least 90%. However, if the pressure on the low pressure side is determined to be 2 atm, then the water will need to contain at most 50% air i.e. be degassed by at least 50%. In FIG. 1, the blade 22 is a left hand drive blade, and when rotated counter-clockwise, the low pressure side 22a is positioned on the shaft side of blade 22 and the high pressure side 22b is positioned opposite the shaft side of the blade 22. Counter-clockwise rotation of the blade 22 causes a net fluid flow in the direction of arrow 26. However, as should be appreciated, the low pressure side and high pressure side will swap with one another when the blade 22 is rotated in the opposite direction.

The form of degasser 12 varies depending on the application of system 10. In some forms, the degasser uses (hydrophobic) hollow-fibre membranes connected to a vacuum system. Hollow-fibre membranes can be used to degas fluids up to 99.5%. However, for most applications, more modest degassing levels of approximately 80% are sufficient to minimise or prevent cavitation. Hollow-fibre membranes work by flowing through one side of a hollow fibre and subjecting the other side of the hollow fibre to a vacuum, resulting in dissolved gases in the fluid passing through the membrane. It should be noted that water vapour also passes through the hydrophobic membrane pores, so in some embodiments drying agents are used to collect this water and prevent its contact with the vacuum pump. Other forms of degassers include centrifugal degassers or cavitation degassers. Cavitation degassers work by driving out cavitated bubbles to remove dissolved gasses. To provide an adequate flow of degassed water, some embodiments can have more than one degasser.

The reservoir 14 has an outlet in the form of conduit 18 that is positioned adjacent blade 22 and is configured to direct the degassed water towards blade 22. In particular, the conduit 18 is configured to direct the degassed water towards the lower pressure side 22a of blade 22. Conduit 18 is provided with an outlet in the form of openings 20 that open into the first fluid i.e. water for the embodiment of FIG. 1 to allow degassed water to be directed towards blade 22. Without being bound by theory, once the degassed water contacts blade 22, it spreads out along a planar surface of the blade 22 to form a boundary layer of degassed fluid. The negative pressures required to form cavities in a degassed fluid are generally higher than those in gassed fluids i.e. it is harder to form a cavity in degassed fluids. Therefore, the boundary layer of degassed fluid helps to reduce the occurrence of cavitation.

Since the conduit 18 is positioned on the low pressure side 22a of the blade 22, degassed fluid exiting openings 20 can be sucked into the low pressure region generated on the low pressure side 22a. In this way, the degassed water may form a more general boundary region of degassed fluid rather than solely as a boundary layer at blade 22. Suction of the degassed fluid into the low pressure region on the low pressure side 22a can help to evenly distribute the degassed fluid to ensure that the boundary layer is spread evenly at and/or around blade 22. Whatever form the boundary layer takes, it contains at least partially degassed fluid which helps to at least reduce the occurrence of cavitation during use of blade 22.

Figure 2:
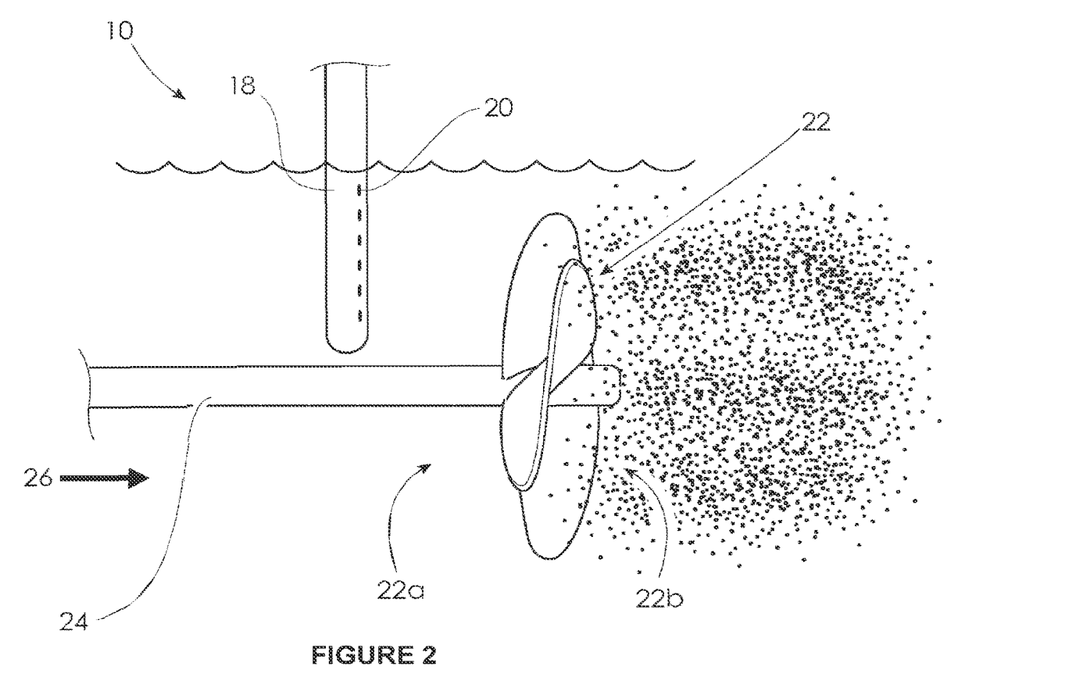
FIG. 2 shows the system of FIG. 1 when a surface is moved relative a first fluid in the absence of degassed fluid.
Figure 3:
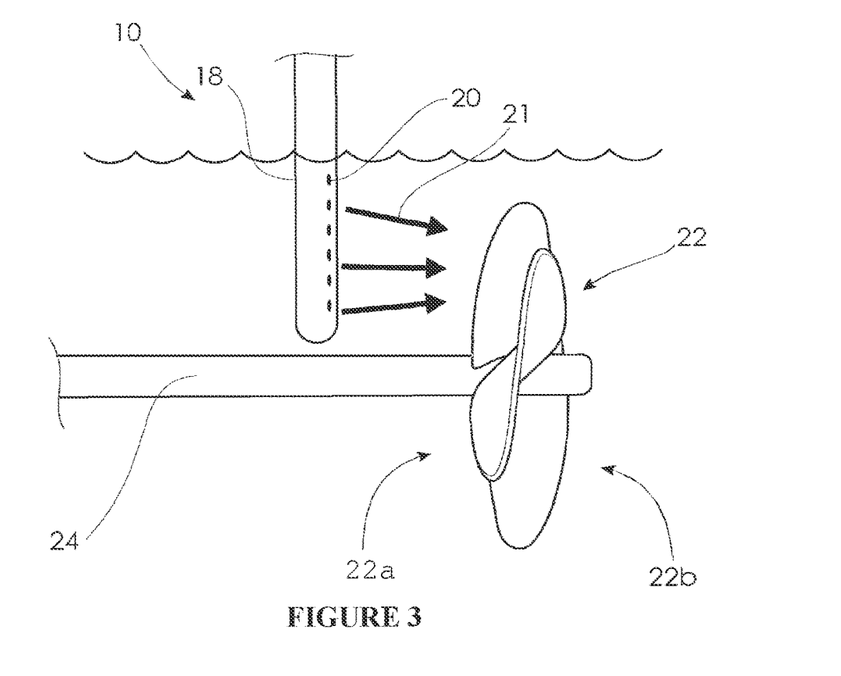
FIG. 3 shows the system of FIG. 1 when a surface is moved relative a first fluid in the presence of degassed fluid.

FIG. 2 shows the system 10 of FIG. 1 in use when there is no flow of degassed water and the boundary layer does not form at the surface of blade 22. In this embodiment, the blade 22 is spinning at 2,300 RPM. Cavitation is evident by the formation of bubbles forming at the blade 22 and running in the direction of flow 26 running away from blade 22. The presence of gassed water means that the low pressure generated at the low pressure region 22a is below the vapour pressure of water at the given temperature. As shown in FIG. 3, once flow of 80% degassed water is commenced, the degassed water flows out of openings 20 in the general direction of arrows 21 towards the low pressure side 22a of the blade 22. As soon as the flow of the degassed water is commenced, the boundary is formed and cavitation ceases. In the embodiment of FIG. 3, the volumetric flow rate of the degassed water is approximately 60 mL/min and is 10% of the volumetric flow rate of the water passing generally over the blade 22. However, it would be appreciated that the ratio of the volumetric flow rate of the first fluid i.e. water to the second fluid i.e. degassed water varies depending on the amount of degassed second fluid required to form the boundary layer. For clarity, certain features of system 10 have been omitted from FIGS. 2 and 3. While the volumetric flow rates of the embodiment of FIG. 3 are for small scale applications, the volumetric flow rates for applications on large scales, such as a commercial vessel, can be calculated e.g. using the Reynolds number.

System 10 also has a flow control 21. Flow controller 21 can take many forms. In one form, the flow controller is a pump located on conduit 18 that pumps degassed fluid from reservoir 14 through conduit 18 and out of openings 20 into the first fluid. The pump is connected to programmable computer logic (PCL) or similar to ensure that a sufficient volumetric flow rate is maintained so as to maintain the boundary layer. Sensors, such as flow rate, temperature and pressure sensors are used to determine the characteristics of the first fluid and operation parameters of blade 22 to provide inputs into the PCL to ensure that the boundary layer is maintained during use of blade 22. Flow controller 21 can also be in the form of a restriction valve, such as a variable aperture valve, located in conduit 18. In some embodiments, the restriction valve is used in addition to the pump, where the pump is set at a predetermined speed and the restriction valve is adjusted to increase or decrease the volumetric flow of the degassed fluid from reservoir 14.

Because openings 20 are positioned adjacent to low pressure side 22a, the degassed fluid tends to be sucked into the low pressure region on the low pressure side of the blade 22. Therefore, the greater the low pressure next to blade 22, the greater the sucking power of the low pressure region. This sucking power is used in some embodiments as a means to pump degassed fluid from reservoir 14 through conduit 18 and out of openings 20. The faster blade 22 spins, the lower the pressure and the more likely cavitation will occur. However, as the pressure lowers, the suction power increases which helps to increase the rate of volumetric flow of degassed water. This, in turn, helps to provide a passive feedback system to maintain the boundary layer. To help control the passive feedback system, in some embodiments the control flow 21 is in the form of a restriction valve that helps to regulate the volumetric flow rate of the degassed fluid. The restriction valve is connected to PLC or similar and sensors to help maintain the boundary layer.

Since gassed water i.e. the first fluid is continuously flowing past blade 22 when blade 22 is rotating at a first fluid volumetric flow rate, the boundary layer needs to be continuously replenished. The rate at which the boundary layer needs replacing is dependent on that rate at which the first fluid flows past blade 22, i.e. the first fluid volumetric flow rate flowing along the direction of arrow 26, and the amount of degassing required to minimise or prevent cavitation. As the first fluid volumetric flow rate increases, the second volumetric flow rate generally needs to increase proportionally. However, the ratio of the first fluid volumetric flow rate to the second fluid volumetric flow rate does not always remain the same. To form the boundary layer, the volumetric flow rate of the degassed water is up to 50% of the volumetric flow rate of gassed water i.e. the water generally flowing past blade 22. In some embodiment, the volumetric flow rate of degassed water is approximately 10% that of the volumetric flow rate of gassed water. The ratio of gassed to degassed water will depend on the pressure at the low pressure side of blade 22 and the surface area of blade 22. As the blade size increases, the degassed volumetric flow rate will generally need to increase so as to provide sufficient amounts of degassed water to form the boundary layer. In some embodiments, the second fluid replaces the gassed fluid, for example in an industrial plant.

Figure 7:
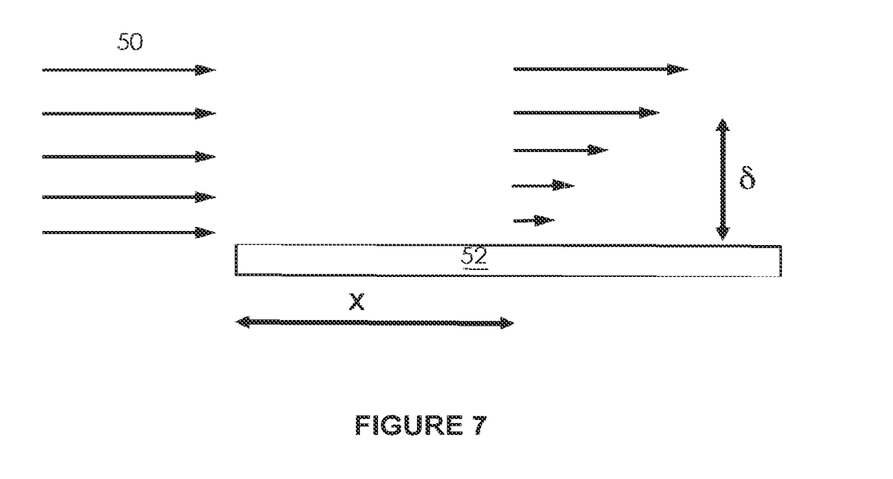
FIG. 7 shows a schematic representation of zero-slip boundary conditions.

In the embodiment of FIG. 1, the lowest pressure regions of the low pressure side 22a are at the following edge and the tip 22c of the blade 22. For zero slip conditions water flow across a plate of length 'x' (e.g. blade 22), water flow will slow down close to the surface and this effect will increase with an increase in 'x', as shown in FIG. 7. The experimental boundary layer equation can be used to calculate the thickness ($\delta$) of the water layer next to the plate which reaches 99% of the bulk water flow velocity:

$$\delta = \frac{5x}{\sqrt{R_e}}. \qquad \text{Eq 1}$$

This situation can be described by FIG. 7 illustrating the 'zero-slip' condition, where flow of fluid 50 slows down when in proximity to surface 52, with the speed of the fluid in proximity to the surface (54) depends on the distance x the fluid has flown over the surface 52 and the thickness $\delta$ of the fluid layer.

The Reynolds number is given by $$R_e = \frac{\rho V_\infty x}{\mu} \qquad \text{Eq 2}$$

where $\rho$ is the density of water, V the bulk fluid velocity (i.e. at an infinite distance from the static plate), $\mu$ is the dynamic viscosity of water, and x is the length of the surface.

Typically, $R_e$ will be high and correspond to laminar flow in the range 1000 to $5\times10^5$. For example, if Re=50,000, the boundary layer water thickness ($\delta$) will be about 1.12 cm for an x value of 0.5 m. Much closer to the surface, say within 1% of the boundary layer thickness from the surface, the water moves only slowly relative to the solid surface. As an example, this would roughly correspond to a water layer of about 112 μm thickness, for a water flow velocity of 10 cm/sec.

Cavitation occurs when dissolved gas is present in a fluid such as water. For the diffusion of gas in one direction (x), the appropriate equation is Fick's second law in the form:

$$\frac{\partial C}{\partial t} = D\frac{\partial^2 C}{\partial x^2}. \qquad \text{Eq 3}$$

where C is the solute concentration and D the diffusion coefficient. At the initial condition, when completely degassed water is exposed to air at atmospheric pressure, there must be a very thin layer at the surface of the water which will be at the saturated dissolved concentration (of about 1 mM). This layer will form rapidly and will maintain its saturated concentration from then onwards (in equilibrium with the atmosphere) and the dissolved gas will diffuse into the water. Thus, Fick's law must be solved for the boundary conditions: $C=C_0$, when x=0 for any value of t and $C_x=0$ for x>0 when t=0. Also, $C_x=C_0$ for any value of x as t becomes very large. The solution to Fick's law under these conditions is:

$$C = C_0\left[1 - \text{erf}\left(\frac{x}{2\sqrt{Dt}}\right)\right]. \qquad \text{Eq 4}$$

where the error function can be calculated using either tables or, as for the present calculation, using the series:

$$\text{erfx} = \qquad \qquad \qquad \qquad \qquad \text{Eq. 5}$$

$$\frac{2}{\sqrt{\pi}} \int_0^x e^{-t^2} dt = \frac{2x}{\sqrt{\pi}} \left[ 1 - \frac{x^2}{1*3} + \frac{x^4}{2*1*5} - \frac{x^6}{3*2*1*7} + \ldots \right].$$

Figure 8:
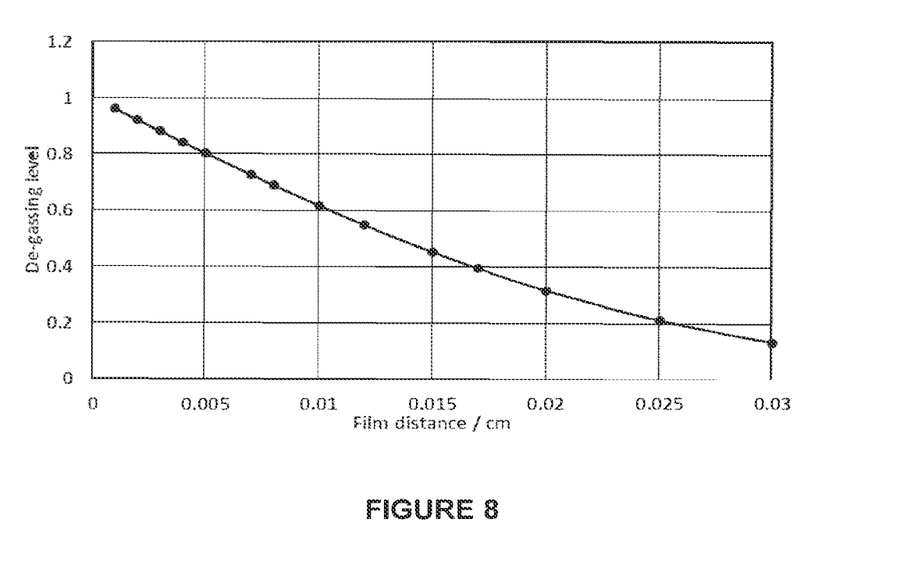
FIG. 8. De-gassing levels following atmospheric gas diffusion into an initially completely de-gassed, quiescent, water film, after 10 secs.

For oxygen and nitrogen gases in water the value of the diffusion coefficient D at 20° C. is $2 \times 10^{-5}$ cm$^2$/sec and the saturated gas concentration, $C_0$ is 1 mM. Using these values the graph of FIG. 8 can be plotted which shows the degassing level as a function of diffusion relative to a film thickness. These calculated results indicate that, for quiescent water, that is, in the almost stationary part of the boundary layer, closest to the solid surface, significant re-gassing of a de-gassed water film, of about 100 μm thickness, would take several seconds.

When using blade 22, a transient coating of a thin boundary layer of de-gassed water on the rapidly rotating blade 22 in use can prevent cavitation effects for many subsequent rotations. This means that the amount of degassed water required to prevent or minimize cavitation can be substantially reduced and the effect of cavitation minimization can in some embodiments persist for a significant period of time e.g. a few or more seconds. The effect of reducing the occurrence of cavitation should persist until the stationary film drains as the blade rotates or until diffusion from the bulk fluid re-gasses the degassed film.

The effects of having a transient film of degassed fluid could be further optimised by having a periodic, controlled release of a positive, relatively high pressure flow of degassed fluid, released close to the rotating blade and timed to strike close to the leading edge on the negative pressure side 22a of the blade 22. Once the de-gassed fluid strikes the blade 22, it coats the blade (transiently) with a thin film of de-gassed fluid (e.g. water) to form the boundary layer. The zero-slip boundary condition expected for most blade surfaces will ensure the transient retention of a thin, de-gassed, film next to the rotating surface in some embodiments. Put another way, the degassed fluid is periodically directed to the surface by using a pulsed flow to form the boundary layer. Use of a pulsed flow of degassed fluid may mean de-gassed fluid only needs to be released in a periodic fashion, such as every 1 in 100 rotations of the blade or only for 1% of the time.

In some embodiments periodically directing the degassed fluid includes pulsing the flow of the degassed fluid towards the blade 22. A regular time interval between pulses is used in some embodiments, while in other embodiments the time interval between pulses is dependent on the conditions at the low pressure side 22a of the blade 22. In some embodiments, sensors are used to determine the time interval between pulses. A flow controller can be used to control the delivery of the degassed fluid.

The leading edge of the rotating blade will generate a high positive pressure which will suppress cavitation. As the blade rotates, the thin stationary film of de-gassed water will tend to drain towards the following (low pressure) edge of the blade, due to the shear forces of the water flowing over the blade, where it will continue to suppress cavitation. At the same time, dissolved gases within the flowing fluid (e.g. water) will begin to diffuse into the thin boundary layer of de-gassed water. However, gas diffusion under effectively quiescent conditions next to the solid surface is relatively slow and for a 0.1 mm film this re-gassing will take several seconds.

In addition to these effects, the centrifugal forces generated by the rotating blade 22 will also tend to force the stationary, initially de-gassed, boundary layer to flow towards the tip 22c of the rotating blade, which will also help to prevent cavitation at this point, where it is often observed. In some embodiments the degassed boundary layer is present for a plurality of rotations of the blade 22, such as 100 rotations, although this is dependent on the speed at which the blade 22 is rotating.

The zero-slip condition expected for most propeller materials can be ensured by selection of a suitable hydrophilic surface capable of surface binding to water. This will aid the formation of a boundary layer. Therefore, in some embodiments the surface is provided with a hydrophilic coating. Hydrophobic materials such as Teflon can produce slip conditions which are not conducive to the formation of boundary layers. Also, hydrophobic surfaces are well-known to aid cavitation. In some embodiments, micro-surface roughness is used to enhance boundary layer formation by reducing surface flow across the propeller.

It should also be appreciated that the temperature of the gassed and degassed waters (or fluids) will also determine the relative volumetric flow rates of gassed and degassed water since cavitation tends to occur more readily in warmer water, and viscosity decreases with increases in temperature, leading to faster rates of shear at the boundary layer. Therefore, as the gassed water temperature increases, the volumetric flow rate of the degassed water and/or the rate of degassing increases. Sensors are used in some embodiments to monitor fluctuations in temperature and to provide inputs into a PCL so as to adjust the volumetric flow rate of the degassed water. Alternatively, the degassed fluids may be passed through a heat exchanger to maintain a temperature of the degassed fluid. Degassed water or fluids at lower temperatures will form a more durable boundary layer on a surface, regardless of the temperature of the gassed fluid.

Openings 20 are generally positioned in close proximity to the low pressure side 22a.

This helps to reduce excessive mixing of gassed and degassed water. If the path length between openings 20 and the low pressure side 22a is long, diffusion of gassed and degassed fluids results in the degassing levels of the degassed fluid decreasing. This can be overcome by increase the degassing level during degassing with degasser 12. However, if the time required to travel the path length is small, there may not be time for sufficient diffusion of gassed and degassed water to lower the degassing level of the degassed water, and there may not be any need to adjust the initial degassing level. Diffusion will also slow down if the degassed water or fluid is kept cool. Since it is generally easier to degas a relatively warm fluid, some embodiment may be provided with a first heat exchanger for heating the fluid to be degasses to assist in degassing, and a second heat exchanger for cooling the degassed fluid prior to forming the boundary layer.

Figure 4:
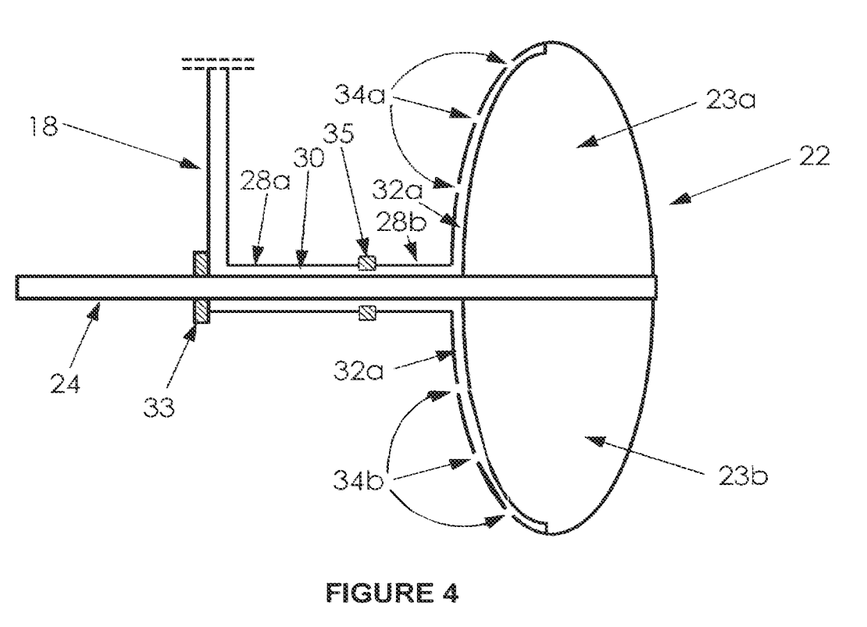
FIG. 4 shows a side view of an embodiment of system for reducing cavitation at a surface.

FIG. 4 shows an alternative embodiment of the outlet. In this embodiment, a first hollow sleeve 28a is coaxially arranged with shaft 24 to form annulus 30. Conduit 18 is in fluid communication with annulus 30. So that annulus 30 is sealed, the shaft 24 passes through a water tight seal 33, such as a gland, stuffing box or O-ring seal. A second hollow sleeve 28b is coaxially arranged around shaft 24 to further continue annulus 30 along the length of shaft 24. The second hollow sleeve 28b is connected to the first hollow sleeve 28 by water tight seal 35. Extending along a first blade 23a of blade 22 is passage 32a having holes 34a. Blade 22 also has a second blade 23b having a passage 32b also having holes 34b. Passages 32a and 32b are connected to the second hollow sleeve 28b and are in fluid communication with annulus 30. In this way, degassed water being delivered through conduit 18 is passed through annulus 30 and passages 32a and 32b before exiting through holes 34a and 34b to deliver degassed fluid to blade 22 to form a boundary layer.

Since the second hollow sleeve is connected to blade 23a and 23b to allow fluid communication between annulus 30 and passages 22a and 22b, the second hollow section will rotate with bade 22 around the axis defined by shaft 24. The first hollow section 28a cannot rotate, so seal 35 is configured to allow second hollow sleeve 28b to rotate relative to first hollow sleeve 28a whilst maintaining a water-tight seal. Seal 35 can be a gland, stuffing box or O-ring seal. The particular location of seal 35 is not important, so long as it allows sleeve 28b to rotate relative to sleeve 28a. In some embodiments seal 35 is positioned on blade 22. In this arrangement, second sleeve 28b is not always needed. In other embodiments, the shaft 24 has a bore extending along its longitudinal length, with the bore being in fluid communication with conduit 18.

The embodiment of FIG. 4 is exemplary and it would be appreciated that passages 32a and 32b could be positioned on an exterior surface of blade 22 or could be positioned internally. Passages 32a and 32b are shown as being integrally formed with blade 22, but they do not always need to be. There can also be any number of blades having passages and holes e.g. 23a-x, 32a-x and 34a-x for three, four, five and six blade plus propellers. The number of holes is not particularly important, so long as the degassed water can be directed towards the surface of blade 22 to form a boundary layer. An advantage of the embodiment of FIG. 4 is that the degassed water is released at the surface of blade 22. In general, holes 23a-x release the de-gassed fluid all along the leading edge of the low pressure side of a propeller. This helps to reduce diffusion and mixing of the gassed and degassed water. The principles described for FIG. 4 can also be applied to other surfaces, such as impellers, hydrofoils, water jet intakes, nozzles and valves.

Figure 5:
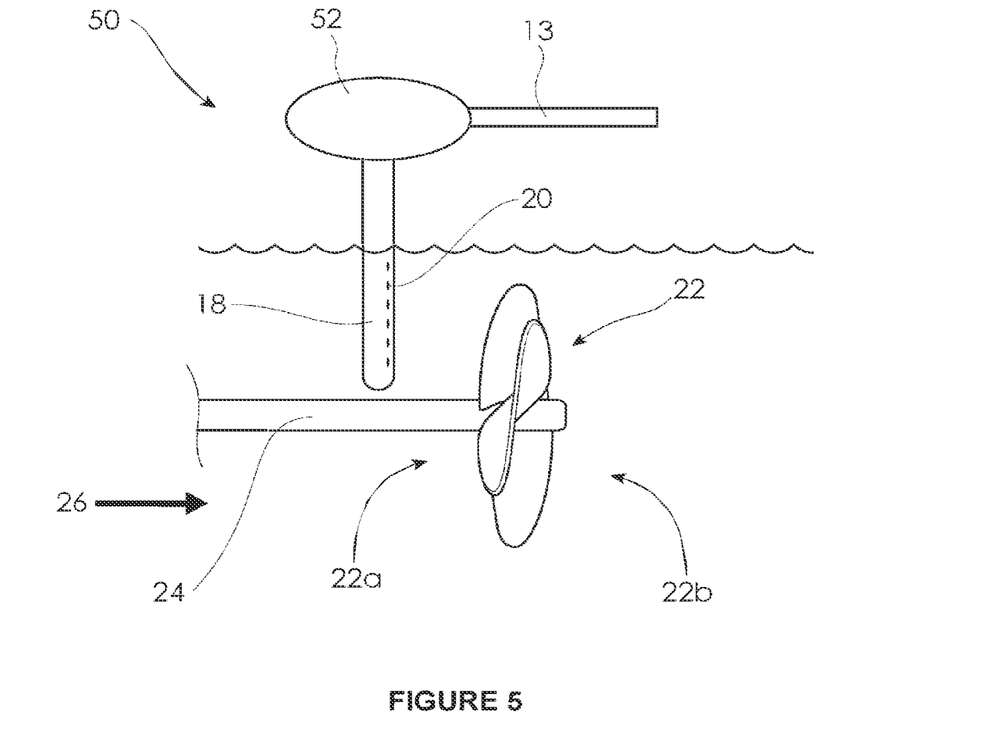
FIG. 5 shows an embodiment of system for reducing cavitation at a surface.

FIG. 5 shows an alternate system 50. System 50 is similar to system 10, but there is no dedicated reservoir. Instead, the reservoir is integral with degasser 52. For example, in some embodiments the internal cavities of the degasser 52 have a volume sufficient to house an adequate amount of degassed water. Alternatively, the degasser 52 is a continuous flow degasser that provides degassed water at the required volumetric flow rate. When the degasser 52 is a continuous flow degasser, there is no need to provide flow controller 21. However, some embodiments may use flow controller 21 between degasser 52 and openings 20 to help regulate the volumetric flow rate of the degassed water. In some embodiments, the degasser is located within the reservoir.

While embodiments have been described in relation to the use of blade 22 and water-based systems, the disclosed systems and methods can be applied to other applications where a surface is moved relative to a first fluid. Such examples include turbopump feed systems of liquid fuelled rocket motors, minimising cavitation wear, oxidation (of fluids and piping/plant), biological and inorganic fouling, pumping aqueous and/or non-aqueous and/or cryogenic fluids (cavitation occurs in all pumps including piston pumps), and minimising cavitation through valves. The term 'pumped fluid loop' covers all applications such as hydraulic, lubrication, and refrigeration systems.

Embodiments will now be described with reference to non-limiting examples.

EXAMPLES (1). Exemplary System Setup

In an embodiment, tap water was used for determining of degassing effects on cavitation. A small hollow fibre membrane (model: 2×6 Radial Flow Superphobic supplied by Membrana, Charlotte, USA) was used to degas the tap water. A vacuum pump, Fossa FO 0015 A (Busch Sydney, Australia) with ultimate pressure ≤2.5×10-2 mbar, was protected from exposure to water vapour using two 5 L pyrex glass tanks containing pre-dried silica gel, granular, and was used to evacuate the gases from the tap water, whilst circulating tap water within the membrane using a small diaphragm water pump (model: FloJet-D3732-E5011). In order to monitor dissolved oxygen levels in the tap water, a InPro 6900 Oxygen electrode system (Mettler-Toledo Ltd., Melbourne, Australia) with detection limit of 1 ppb was used in these experiments.

The cavitation created by a simple propeller with three blades, attached to an electrical variable rotor, with a maximum rpm of 2960, could be visually observed within a water filled Perspex rectangular tube. Tap water was pumped at 600 mL/min to the membrane and with a vacuum at the outer chamber of the membrane unit, the transmitter which is connected to the oxygen electrode, showed that the oxygen content in the water tank continuously decreased. This process was undertaken in a continuous counterflow process to remove the dissolved gases while passing through the hydrophobic pores of the hollow-fibre membrane.

(2). Prevention of Cavitation Using a De-Gassed Aqueous Environment

With increasing degassing levels, the speed of the propeller could also be increased before cavitation was observed. The results of these rotation rate/degassing measurements is summarised in Table 1, which clearly shows that higher degassing levels make higher cavitation pressure in the system (this data was obtained by the theoretical values of water cavitation in FIG. 6). As an example, 70% degassing was found to be sufficient to prevent cavitation even at the maximum rotation rate of 2960 rpm.

(3). Prevention of Cavitation Using a Local De-Gassed Aqueous Environment

Degassed water was introduced locally, close to the low pressure side of rotating propeller blades, immersed in gas-equilibrated water. In the Perspex tube, gassed tap water flowed freely and degassed (80%) water (60 mL/min i.e. at about 1/10th water flow-rate) were introduced separately via a bent-metallic pipe and a hole pipe. With only gassed tap water flowing within the Perspex tube, visible cavitation occurs, but when local flow of degassed water begins, released adjacent to the propeller blades, all cavitation stops. These experiments were carried out at high rotation rates of 2300 rpm using a four blade propeller. The cessation of cavitation sound on starting the de-gassed water flow was also obvious and immediate.

TABLE 1

Experimental results of degassing effects on cavitation

| Time(min) | Degassing (%) | Cavitation pressure (atm) | Minimum rpm to start cavitation |
|---|---|---|---|
| 0 | 0 | 1 | — |
| 5 | 19.72 | 1.3 | 148 |
| 10 | 27.8 | 1.5 | 592 |
| 15 | 36.9 | 1.6 | 1628 |
| 20 | 45.4 | 1.8 | 2072 |

TABLE 1-continued

Experimental results of degassing effects on cavitation

| Time(min) | Degassing (%) | Cavitation pressure (atm) | Minimum rpm to start cavitation |
|---|---|---|---|
| 30 | 56 | 2.8 | 2500 |
| 60 | 76.7 | 4 | Not even at 2960 |
| 90 | 84.4 | 7 | Not even at 2960 |
| 120 | 87 | 8 | Not even at 2960 |

Similar results for Table 1 were found when a 0.5M NaCl aqueous solution was used to simulate seawater.

(4). Prevention of Cavitation Using Periodically Directed De-Gassed Water

On re-examination of the rotating propeller before and after release of (80%) de-gassed water, there was evidence for the existence and retention of an effective de-gassed water boundary layer. This comes from the observation that the release of de-gassed water (at a flow rate ¹/₁₀th that of the background flow) directly onto only the upper rotating blades produced the same effect as the blade rotated through the following 180°, as seen in FIGS. 1 and 2.

The experiments from (3) were repeated on releasing de-gassed water and then timing the observed effects following cut-off of the de-gassed flow. It was immediately clear that cavitation prevention persisted for several seconds after the degassed water flow was switched off. In these experiments the blades typically passed through over 100 rotations before any sign of cavitation was visible. These observations can only be explained by the boundary layer model.

As a blank or baseline experiment, the effect of the release of normal, gassed water at the same flow rate used with the degassed water was also studied to determine if raising the pressure on the low pressure side of the propeller could also reduce cavitation. The clear observations in these experiments was that release of gassed water directly onto the low pressure side actually enhances cavitation, with the increased cavitation becoming obvious as soon as the gassed water was released.

These results indicate that a pulse of pressured, de-gassed water would only need to be released every 1 in a 100 rotations or only for 1% of the time. This represents a substantial reduction in the volume of degassed water required to form the boundary layer to reduce the occurrence of cavitation. These experiments also demonstrate that an effective boundary layer coating of the low pressure side of a rotating propeller can be produced simply by releasing water close to the propeller blades, under a slightly enhanced positive pressure. This method and the use of a pulsed water release system offers an efficient process for the prevention of propeller cavitation with wide-ranging applications.

In the claims which follow and in the preceding description of the method and system, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the method and system.

It will be understood to persons skilled in the art of the disclosure that many modifications may be made without departing from the spirit and scope of the disclosure.

The invention claimed is:

1. A method for reducing cavitation at a surface that moves relatively with respect to a first fluid, the method comprising:
   directing a second fluid that is at least partially degassed towards the surface such that the second fluid is able to form a boundary layer at the surface, whereby the boundary layer at least partially increases a negative pressure required to initiate cavitation at the surface so as to reduce cavitation when the surface moves relatively with respect to the first fluid; and
   wherein the second fluid is periodically directed to the surface using a pulsed flow to form the boundary layer.

2. A method as claimed in claim 1, wherein the second fluid is degassed by more than 50% relative to a gas-equilibrated form of the second fluid.

3. A method as claimed in claim 2, wherein the second fluid is degassed by more than 80% relative to a saturated form of the second fluid at any pressure.

4. A method as claimed in claim 1, wherein the second fluid is directed towards the surface at a first volumetric flow rate.

5. A method as claimed in claim 4, wherein the first fluid is directed towards the surface at a second volumetric flow rate, with the first volumetric flow rate being up to 50% of the second volumetric flow rate.

6. A method as claimed in claim 1, wherein the second fluid is directed to a first region of fluid adjacent to the surface comprising reduced fluid pressure relative to other regions adjacent to said surface.

7. A method as claimed in claim 1, wherein the second fluid is delivered through a conduit having an outlet that opens into the first fluid.

8. A method as claimed in claim 1, wherein the surface is arranged on or forms a part of at least one of a propeller, hydrofoil, impeller, piston, valve body, restriction valve, orifice or piping.

9. A method as claimed in claim 1, wherein the second fluid is a degassed form of the first fluid.

10. A method as claimed in claim 1, wherein the first fluid and/or the second fluid is an aqueous solution.

11. A method as claimed in claim 1, further comprising operating a flow controller to control a flow of second fluid directed towards the surface to form the boundary layer.

12. A system for reducing cavitation at a surface that moves relatively with respect to a first fluid, the system comprising:
    a degasser configured to at least partially degas a second fluid, wherein the second fluid is periodically directed to the surface using a pulsed flow to form the boundary layer;
    a reservoir in communication with the degasser and configured to house an at least partially degassed second fluid, the reservoir having an outlet that is arranged for directing the second fluid towards the surface;
    wherein the system is configured such that directing the at least partially degassed second fluid towards the surface forms a boundary layer at the surface, whereby the boundary layer at least partially increase a negative pressure required to initiate cavitation at the surface so as to reduce cavitation when the surface moves relatively with respect to the first fluid.

13. A system as claimed in claim 12, wherein the degasser is configured to degas the second fluid by more than 50% relative to a gas-equilibrated form of the second fluid.

14. A system as claimed in claim 13, wherein the second fluid is degassed by more than 80% relative to a saturated form of the second fluid at any pressure.

15. A system as claimed in claim 12, wherein the system is configured to direct the second fluid towards the surface at a first volumetric flow rate.

16. A system as claimed in claim 15, wherein the first fluid moves relatively at a second volumetric flow rate, with the first volumetric flow rate being up to 50% of the second volumetric flow rate.

17. A system as claimed in claim 12, wherein the outlet is positioned at a first side of the surface in use adjacent to fluid of reduced pressure relative to other sides of said surface.

18. A system as claimed in claim 12, wherein the surface is arranged on or forms a part of at least one of a propeller, hydrofoil, impeller, piston, valve body, restriction valve, orifice or piping.

19. A system as claimed in claim 18, wherein the outlet is provided on or at the propeller, hydrofoil, impeller, piston, valve body, restriction valve, orifice or piping.

20. A system as claimed in claim 12, wherein the outlet is provided towards or at an end of a conduit.

21. A system as claimed in claim 12, further comprising a flow controller in communication with the reservoir for controlling a rate of flow of second fluid to be directed towards the surface.

\* \* \* \* \*